(No Model.)

P. MORGENROTH & T. LEVISON.
FLOUR SIFTER.

No. 333,966. Patented Jan. 5, 1886.

WITNESSES:
A Faber du Faur Jr.
William Miller

INVENTORS:
Pauline Morgenroth.
Tinne Levison.
BY
Van Santvoord & Hauff
their ATTORNEYS

United States Patent Office.

PAULINE MORGENROTH AND TINNE LEVISON, OF BROOKLYN, NEW YORK.

FLOUR-SIFTER.

SPECIFICATION forming part of Letters Patent No. 333,966, dated January 5, 1886.

Application filed October 15, 1885. Serial No. 180,004. (No model.)

*To all whom it may concern:*

Be it known that we, PAULINE MORGENROTH and TINNE LEVISON, both citizens of Germany, residing at Brooklyn, in the county of Kings and State of New York, have invented new and useful Improvements in Flour-Sifters, of which the following is a specification.

Our invention relates to improvements in devices for sifting flour or other material of a similar nature; and it consists, essentially, in the combination, with a casing, of a screen situated in said casing and a rotary agitator situated above the screen and having therein holes with downwardly-projecting edges. The casing is provided with a cover and a removable bottom or tray, and the agitator is provided with a shaft having bearings in the screen and cover, and a crank is secured to the upper end of the shaft, whereby the agitator may be rotated.

The novel features above mentioned are more fully pointed out in the following specification and claims, and illustrated in the accompanying drawings, in which—

Figure 1:
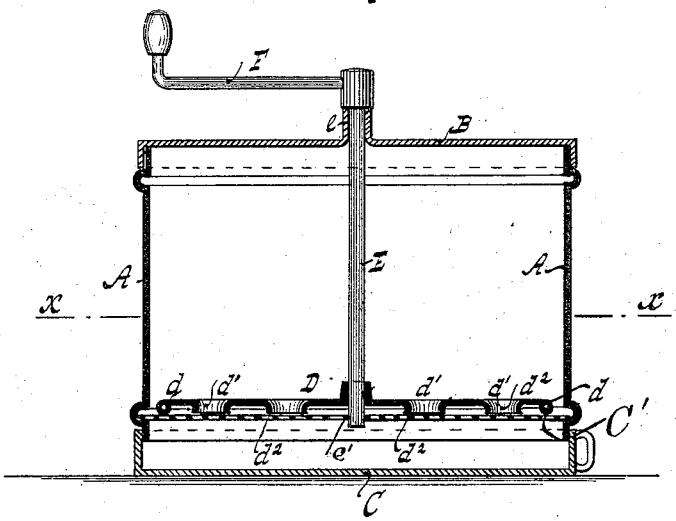
Figure 2:
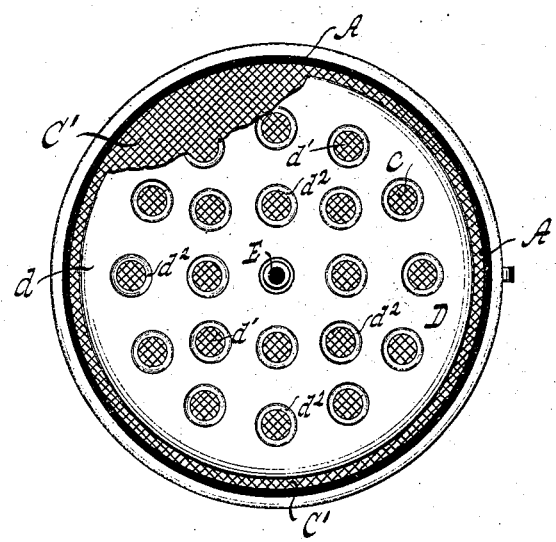

Figure 1 represents a vertical central section of our improved flour-sifter. Fig. 2 is a horizontal section in the plane $x$ $x$, Fig. 1.

The same letters indicate the same or corresponding parts.

In the drawings, the letter A designates a circular casing, which is open at its top and bottom.

B, Fig. 1, is a removable cover fitting over the upper edge of the casing, and C is a detachable bottom or tray, which receives the sifted material, all said parts being composed of sheet metal or other suitable material.

C′ is a screen secured in the lower part of the casing A, and above this screen is situated the agitator D, which consists of a circular disk, $d$, having therein a number of holes, $d'$, which are punched in such a manner as to leave burrs $d^2$ projecting downwardly beyond the lower face of the disk. The disk $d$ is secured to a vertical shaft, E, having a bearing at $e$ in the cover and a bearing, $e'$, in the screen, and said disk is supported at such an elevation above the screen that the downwardly-projecting edges or burrs of the holes $d'$ are almost in contact with the screen C′. To the upper end of the shaft is secured a crank, F, which is detachable, in order that the cover B can be removed when it is desired to fill the sifter.

When the agitator D is rotated, the flour or other material in the space above falls through the holes $d'$ in said agitator upon the screen C′, and is carried around on the same by the burrs $d^2$ of the said agitator, whereby the flour or other material is caused to drop through the screen. This operation is greatly facilitated by the burrs or downwardly-projecting edges $d^2$. The flour or other material falling through the screen is received by the detachable bottom or tray C, and can be removed from the sifter. The tray C might be dispensed with, and the flour or other material allowed to fall directly in a dish or other receptacle; but as this tray is caused to neatly fit the bottom of the casing A no flying particles of the sifted material will escape in the surrounding space.

The peculiar construction of the agitator D causes the material operated upon to be equally distributed upon the screen, and the screen cannot become clogged and rendered useless, since the burrs of the agitator move close to the same and the material is kept in constant motion upon the screen, the smaller particles dropping through the meshes of the screen while the larger particles are carried around with the agitator.

What we claim as new, and desire to secure by Letters Patent, is—

1. The combination, with the casing A, the shaft E, and screen C′, of the rotary agitator, consisting of the disk D, fixed to shaft E, and provided with holes $d'$, substantially as described.

2. The combination, with the casing A, of the rotary agitator D, formed with the holes $d'$ therein, having downwardly-projecting edges or burrs $d^2$, and the screen C′ below said agitator, substantially as shown and described.

3. As a new article of manufacture, a flour-sifter consisting of a casing open at its top and bottom, a cover fitting the top of the casing, a removable bottom or tray, a screen in the lower part of the casing, a disk situated above the screen and having therein holes with downwardly-projecting edges or burrs, a shaft provided with bearings in the cover and screen, and a detachable crank, which is attached to the upper end of the shaft, substantially as shown and described.

4. The herein-described agitator D, consisting of a disk, $d$, having therein holes $d'$, provided with downwardly-projecting edges or burrs $d^2$, and a rotary shaft secured to the disk, substantially as shown and described.

In testimony whereof we have hereunto set our hands and seals in the presence of two subscribing witnesses.

PAULINE MORGENROTH. [L. S.]
TINNE LEVISON. [L. S.]

Witnesses:
A. FABER DU FAUR, Jr.,
E. F. KASTENHUBER.